Sept. 30, 1969     F. URBACH ET AL     3,469,925

METHOD FOR DETERMINING IMAGE SHARPNESS

Filed March 25, 1966     2 Sheets-Sheet 1

Fluorescent Phosphor With Non-Linear Response

GEORGE C. HIGGINS
FRANZ URBACH
INVENTORS

BY *[signatures]*

ATTORNEYS

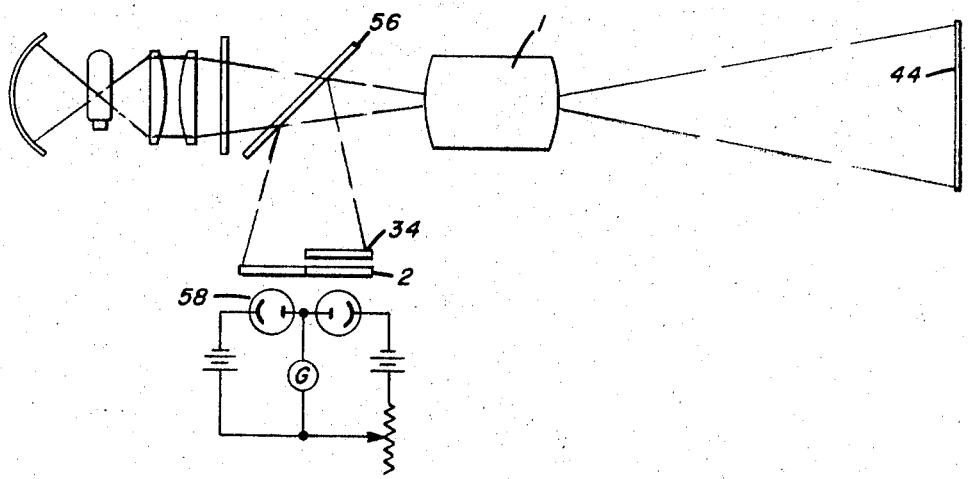
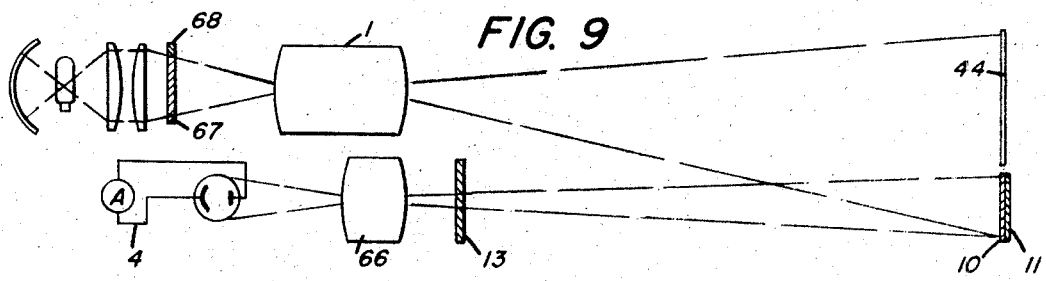
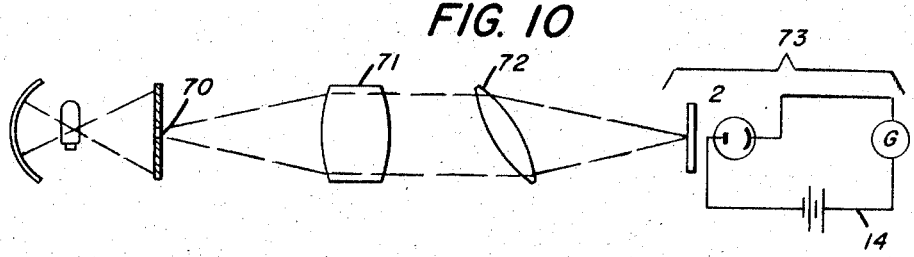

United States Patent Office 3,469,925
Patented Sept. 30, 1969

3,469,925
METHOD FOR DETERMINING IMAGE SHARPNESS
Franz Urbach and George C. Higgins, Rochester, N.Y., assignors to Eastman Kodak Company, Rochester, N.Y., a corporation of New Jersey
Filed Mar. 25, 1966, Ser. No. 537,336
Int. Cl. G01j *1/00, 3/48;* G03b *3/00*
U.S. Cl. 356—122                     2 Claims

ABSTRACT OF THE DISCLOSURE

A method for indicating and measuring the relative sharpness of a real image and for automatically controlling the relation of the image to its focal plane. In this system phosphors having a nonlinear response are used as a photosensitive material in the measuring system.

---

This invention relates to a method and apparatus for indicating the relative sharpness of and for automatically focusing a real image. More specifically, this invention relates to the use of phosphors with a non-linear response as the photosensitive material in automatic analysis systems.

It is an object of this invention to provide a method of measuring the sharpness of images, automatically focusing images or testing the imaging ability of lenses.

It is another object of this invention to provide a method of measuring image sharpness that is several times more sensitive than prior methods using the non-linearity of response of photoconductors as the image sensitive feature.

There are many methods for comparing relative sharpness of two images of comparable radiation. (For purposes herein, two different conditions of focus of the same image forming radiation shall be considered as two images.) Among these methods are some which depend on the non-linear response of photoconductors, see Craig, D. R., "Image Sharpness Meter," in Photographic Science and Engineering, vol. 5, No. 6, pp. 337–342, November-December 1961. In these methods the response from a photoconductor which is imagewise illuminated is compared electrically with the response from a similar photoconductor illuminated by the same total amount of radiation but with less image characteristics. If the photoconductive response is non-linear, there will be a difference in the resistance in the two photoconductors directly traceable to the difference in image sharpness.

Ordinarily, phosphors are not used in place of photoconductors as the sensitive elements in radiation monitoring. This is because the response of a phosphor to incident radiation is an emitted radiation which must in turn be monitored by a photosensitive measuring device. The photoconductor, therefore, would not generally be eliminated. However, it has been found that a large number of phosphors can be made extremely non-linear, usually by adding a trace of nickel to the phosphor, see Nail, N. R., Urbach, F., and Pearlman, D., "New Observations on Superlinear Luminescense"; in Journal of the Optical Society of America, vol. 39, No. 8, pp. 690–694, August 1949. Many of these "superlinear" phosphors have response curves to excitation by visible or near ultraviolet radiation with powers of 3.5 over an extended range. Such very strong nonlinearities for photoconductors are known only for responses to infrared radiation.

According to the invention, if the non-linear photoconductor in an image sharpness meter is replaced with one of these phosphors which gives an effectively non-linear response, a much more sensitive method of image analysis is available. In addition, some new methods based on other features peculiar to phosphors can be designed which have no counterpart in the known methods using a photoconductor. Among these new methods is one in which the color of the output radiation changes according to the sharpness of the image.

In the drawings:

FIGS. 7, 8 and 9 are partially diagrammatic cross sections of other embodiments of the invention as applied to focus analysis of a projector.

FIG. 10 is a partially diagrammatic cross section of an automatic lens tester using the invention.

Figure 1:
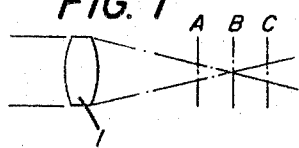
FIG. 1 is a diagrammatic cross section showing positions of images having different characteristics of focus with an optical system.

According to FIG. 1, an optical system 1 projects real images of an object (not shown). The image which is in sharpest focus is located at position B. When an effectively non-linear phosphor layer is placed at positions A, B and C, the response of said phosphor is considerably greater to the image at B than to the image at either A or C.

Figure 2:
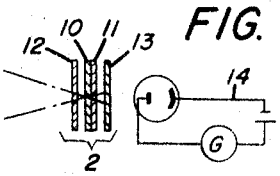
FIGS. 2 and 4 are cross sections of simple embodiments of the invention.
Figure 3:
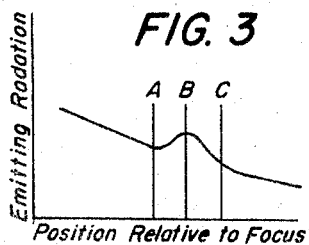
FIG. 3 is a graph showing operation of the invention as shown in FIG. 2 at positions shown in FIG. 1.

According to FIG. 2, a non-linear phosphor 10 is coated on a transparent support 11 and its response is measured by a photoelectric circuit 14. When the phosphor layer in FIG. 2 is moved from position A to position C according to FIG. 1, either by actually moving it or by changing the focus of the optical system, a definite peak is detected by the photoelectric circuit 14 at the position having the image with the sharpest focus. This peak, in this case an absolute maximum, is shown on a graph in FIG. 3 where the emitting radiation is plotted against the position of the phosphor. For best sensitivity a filter 12 which tends to pass only radiation to which the phosphor is sensitive is placed in front of the layer and a filter 13 which tends to pass only radiation of the wavelength emitted by the phosphor is placed behind the layer. Either filter may be in contact with the layer or separate, as shown. In the drawings, the phosphor layer, its support, and any filters may sometimes be considered as a single sandwich 2.

Figure 4:
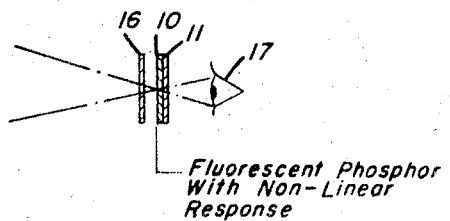

FIG. 4 illustrates an embodiment of the invention in which the phosphor is used for a visual determination of focus. A filter 16 is placed in front of the phosphor layer 10. The filter 16 passes radiation which excites the phosphor but absorbs radiation similar to that emitted by the phosphor. When both radiations are discriminatable by the human eye as different colors, and are allowed to combine as they pass through the support 11 into a color mixture, the combination color seen by an eye 17 changes in color according to the excitation of the phosphor. For example, a 45% zinc sulfide-55% cadmium sulfide phosphor activated with 400 p.p.m. of silver and "poisoned" with 3 p.p.m. of nickel fluoresces with a yellow or orange color in response to blue exciting radiation. Its response is substantially non-linear. When a blue transmitting and yellow absorbing filter was placed in front of such a phosphor and images formed by the same radiation but in various degrees of focus were placed on the phosphor, the resulting combination of light was seen as a weak magenta when in focus but blue when out of focus. This allows a precise focus according to the color change of the resulting mixture of light even though the detail of the image could not be seen at all. The best level of illumination can, of course, be maintained by conventional automatic illumination controls if desired.

Figure 5:
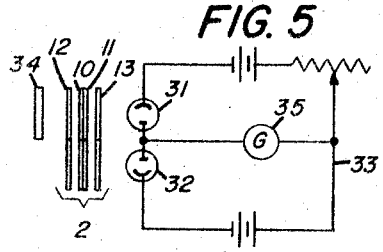
FIG. 5 is an alternate circuit for the invention.

In FIG. 5 a null system is shown. It is similar to that shown in FIG. 2 except that the response of two sections of the phosphor layer are compared. One section is evenly illuminated by inserting a diffusing plate 34 in front of it. Photocells 31 and 32 with circuit 33 then compare the responses of the two sections. If properly calibrated either by adding resistances or by adding a neutral density filter, the degree of focus can be read on the galvanometer 35 independently of fluctuations in image intensity. With proper calibration it can be used to measure the contrast of an image, for example, the contrast of an image on a television receiver.

Figure 6:
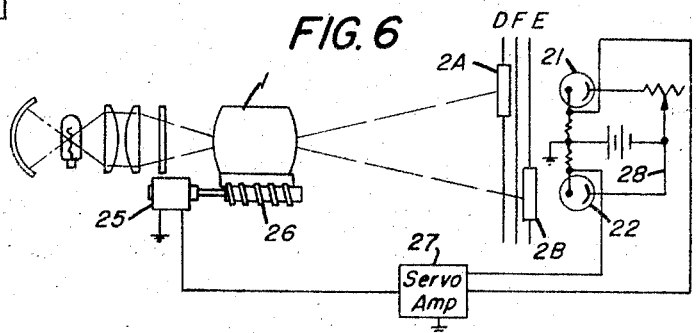
FIG. 6 is a partially diagrammatic cross section showing the application of the invention to automatic focusing of a projector.

FIGS. 6, 7, 8 and 9 show methods of applying the invention to focusing of projector or enlarger optical systems. As shown in FIG. 6, the invention is used to keep an optical system 1 for an enlarger or projector in focus in plane F. Two phosphor plus filter sandwiches 2A and 2B are placed in planes D and E on either side of plane F. Through well-known means including a photoelectric circuit having photocells 21 and 22, which creates an electrical response to the difference between the outputs of the sandwiches, a servo amplifier circuit 27, for receiving said response and a servomotor 25 which drives a worm and rack 26 for changing focus directionally toward reducing said electrical response, the image is focused at a plane F betwen D and E.

Figure 7:
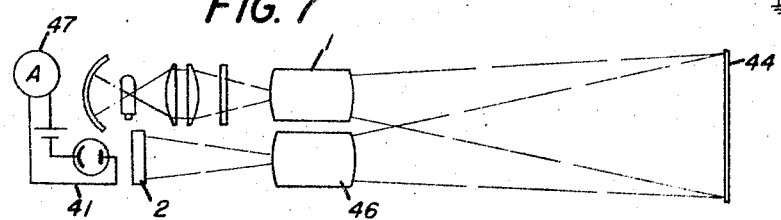

FIGS. 7 and 8 show similar devices in which a projection screen 44 is monitored from the area of the projector. In FIG. 7 an auxiliary lens 46 is used to re-image the image at the phosphor layer which is monitored by a photoelectric circuit 41 having an ammeter 47. In FIG. 8 the projection lens 1 itself is used for the re-imaging function with the light being deflected by means of a beamsplitter 56.

In FIG. 9 the phosphor 10 is placed in the plane of the screen and the response is monitored from the projector area through an auxiliary lens 66.

This figure also illustrates a further improvement in eliminating unwanted variables from the system. An upper portion 68 of slide 67 contains a uniform pattern preferably a checkerboard pattern. This provides a constant subject for the stimulation of the phosphor. This pattern can be part of each slide or movie film or part of the projector object holder and is usable with all of the embodiments of the previous drawings. It is especially useful with automatic focusing as shown in FIG. 6 since radiation from different objects is compared. The constant pattern assures that the radiation is comparable and will not change as the object projected changes.

These devices will work with any optical system in which most of the illuminated detail of the object is in the same plane. In addition to projectors and enlargers, aerial cameras are particularly well suited to devices such as those shown in FIGS. 2, 4 and 6.

The invention can also be adapted to automatic lens testing. Known automatic lens testers focus light rays from a constantly varying object upon a photocell. The signal is then differentiated, giving a quantative reading of the degree of focus of the pencil of rays involved.

In FIG. 10 the invention is applied to a lens tester in which the lens to be tested 72 focuses light from an object 70 which light has been passed through a collimator 71. A receiving unit 73 similar to that of FIG. 2 is placed at the point of focus. Alternatively, the image can be relayed to the unit by use of a microscope objective (not shown).

The invention has been described in considerable detail with particular reference to certain preferred embodiments thereof, but it will be understood that variations and modifications can be effected within the spirit and scope of the invention.

We claim:
1. The method of comparing the sharpness of a plurality of images formed of at least one object by substantially the same incident radiation comprising:
 (1) positioning incident radiation responsive material to reecive each of said images, said material being a phosphor whose response is fluorescence and said incident radiation includes visible exciting radiation which is such that it excites said phosphor to emit fluorescent radiation of a color discriminably different to the human eye from the color of said exciting radiation;
 (2) comparing the responses of said material to said images; and
 (3) combining said exciting radiation and said fluorescent radiation into a mixture wherein the step of comparing the responses is accomplished by comparing the colors of said mixtures at each image.
2. The method according to claim 1 including the step of at least partially eliminating from said incident radiation, radiation of the color of said fluorescent radiation.

References Cited

UNITED STATES PATENTS 3,384,752   5/1968   Odone _____ 250—213

FOREIGN PATENTS 1,319,100   1/1963   France.

RONALD L. WIBERT, Primary Examiner

V. P. McGRAW, Assistant Examiner

U.S. Cl. X.R.

353—101; 356—186